United States Patent [19]

Shindo et al.

[11] Patent Number: 4,808,806
[45] Date of Patent: Feb. 28, 1989

[54] OPTICAL SYSTEM FOR USE IN FOCUS DETECTING APPARATUS

[75] Inventors: Osamu Shindo; Ryota Ogawa, both of Tokyo, Japan

[73] Assignee: Asahi Kogaku Kogyo Kabushiki Kaisha, Tokyo, Japan

[21] Appl. No.: 122,713

[22] Filed: Nov. 18, 1987

[30] Foreign Application Priority Data

Nov. 18, 1986 [JP] Japan .................. 61-275039

[51] Int. Cl.$^4$ .............................. G01J 1/20
[52] U.S. Cl. ...................... 250/201; 354/408
[58] Field of Search ............... 250/201, 204, 208, 209; 354/406, 407, 408; 356/1, 4

[56] References Cited

U.S. PATENT DOCUMENTS

| | | |
|---|---|---|
| 4,600,830 | 7/1986 | Tokutomi et al. ............ 250/201 |
| 4,602,153 | 7/1986 | Suzuki ......................... 354/408 |
| 4,698,492 | 10/1987 | Ohtaka et al. ................ 250/201 |

Primary Examiner—David C. Nelms
Attorney, Agent, or Firm—Sughrue, Mion, Zinn, Macpeak and Seas

[57] ABSTRACT

In an optical system for use in a focus detection apparatus that includes a pair of diaphragm stops and a pair of optical splitting elements disposed just behind said diaphragm stops. Both pairs are symmetrical with respect to the principal axis of light. The optical system detects the focus position by detecting the relative positional mismatch between the refocused images of an object. The optical axis of each of said optical splitting elements is positioned away from the center of aperture of each of the diaphragm stops with respect to the principal axis of light so as to compensate for any transverse chromatic aberration that may develop in the focus detecting apparatus.

3 Claims, 3 Drawing Sheets

λ=SHORT WAVELENGTH    λ=LONG WAVELENGTH

OPTICAL SYSTEM FOR USE IN FOCUS DETECTING APPARATUS

BACKGROUND OF THE INVENTION

The present invention relates to an optical system for use in a focus detecting apparatus in an imaging device such as camera.

The co-inventor of subject application previously filed U.S. patent application Ser. No. 889,535, now U.S. Pat. No. 4,716,431 claiming an invention entitled "Optical System for use in Focus Detecting Apparatus". The optical system disclosed by this prior invention is shown in FIG. 1 and has an auxiliary lens 3 disposed just in front of an optical splitting element 5, with a condenser lens 2 having a rear surface in the form of an ellipsoidal surface. The advantage of this optical system is that it provides a better symmetricity than the prior art apparatus both in the distribution of the quantity of light and in distortion.

In FIG. 1, the numeral 1 signifies a range finding zone (film equivalent surface), 4 is a diaphragm stop, 6 is a sensor, $r_i$ signifies the radius of curvature of an individual lens, and $n_i$ signifies the refractive index of an individual lens.

As shown in FIG. 2, the optical system according to the embodiment described in the above-described U.S. application has a decentered diaphragm stop 4 disposed just behind the auxiliary lens 3, so the rays of light passing through the diaphragm stop 4 will produce transverse chromatic aberration due principally to the auxiliary lens 3. Therefore, if the optical axis of the optical splitting element 5 disposed just behind the diaphragm stop 4 is not offset with respect to the center of the aperture of the diaphragm stop 4, transverse chromatic aberration will be produced on the sensor 6 in varying amounts that depend on the wavelength ($\lambda$) of light as shown in FIG. 2.

The optical system according to the embodiment described above is so designed that the image of an object is divided into two by means of the optical splitting element 5 and that the focus position is detected by sensing the relative positional mismatch between the two split images of the object. Therefore, depending upon the spectral distribution of the object, the transverse chromatic aberration can cause different amounts of relative positional mismatch for the same distance from the object.

This means that so long as the focus position is controlled in such a way that a predetermined amount of relative positional mismatch is to be produced, the position in focus will be influenced by the spectral distribution of the object. In other words, the presence of transverse chromatic aberration is highly deleterious in that a red object will be focused by an imaging lens at a different position than a blue object is focused.

FIG. 3 shows the amount of defocusing (deviation from the proper position in focus) against the spectral distribution of the object, assuming the case where the optical splitting element 5 is not offset with respect to the center of the aperture of the diaphragm stop 4 in the embodiment described in the above-described U.S. application. FIG. 3 does not include the chromatic aberration of the imaging lens.

OBJECTS AND SUMMARY OF THE INVENTION

An object, therefore, of the present invention is to provide a technique by which the transverse chromatic aberration that will be produced in the optical system for focus detecting apparatus described in the above-described U.S. application can be eliminated and which is also capable of canceling the "tendency" of the chromatic aberration of an imaging lens.

As will be understood from the following explanation, in the apparatus of the present invention which includes a pair of diagram stops and a pair of optical splitting elements disposed just behind said diaphragm steps, both pairs being symmetrical with respect to the principal axis of light, and which detects the focus position by detecting the relative positional mismatch between the refocused images of an object, the optical axis of each optical splitting element is located away from the center of the aperture of each diaphragm stop with respect to the principal axis of light, and this is effective in canceling the wavelength-dependent "tendency" of the difference between the AF position of an imaging lens and its full-aperture focus position. Furthermore, in a focus-detecting apparatus of a similar type in which an auxiliary lens having its optical axis on the principal axis of light is disposed ahead of the diaphragm stops, if $\Delta h_{5-4}$ is determined in such a way that the condition expressed by $1 < (r_3 \cdot \Delta l_{5-4})/(r_7 \cdot \Delta h_4) < 2$ is satisfied, (1) the transverse chromatic aberration originating from the condenser lens and the auxiliary lens, and
(2) the transverse chromatic aberration due to the thicknesses of the auxiliary lens and the optical splitting elements can be effectively compensated at the same time. Because of these features, the apparatus of the present invention has the advantage of preventing the occurrence of defocusing due to the spectral distribution of the object to be imaged.

DESCRIPTION OF THE PREFERRED EMBODIMENTS

Figure 1:
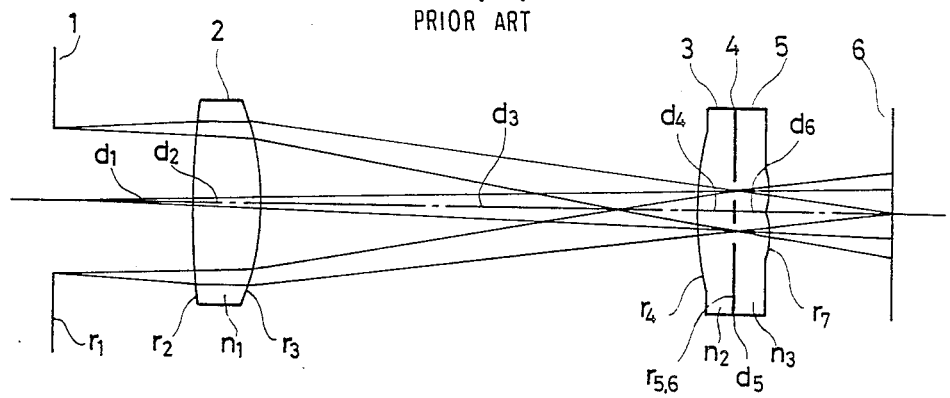
FIG. 1 shows the general layout of a focus detecting apparatus of the prior invention.
Figure 2:
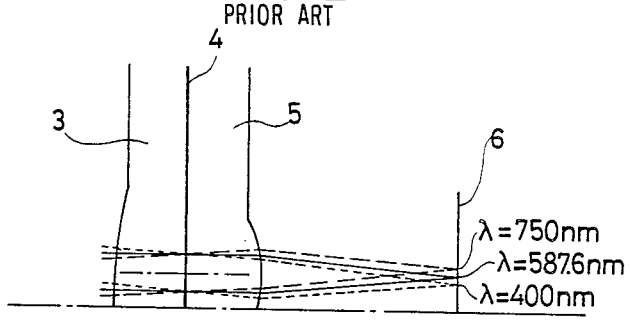
FIG. 2 is a graph showing how transverse chromatic aberration develops in the apparatus depicted in FIG. 1.
Figure 3:
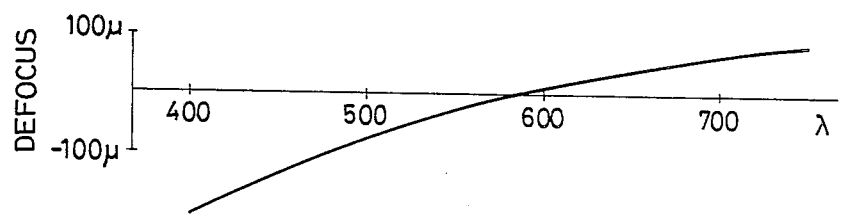
FIG. 3 is a graph plotting the chromatic aberration occurring in the apparatus of FIG. 1.
Figure 4:
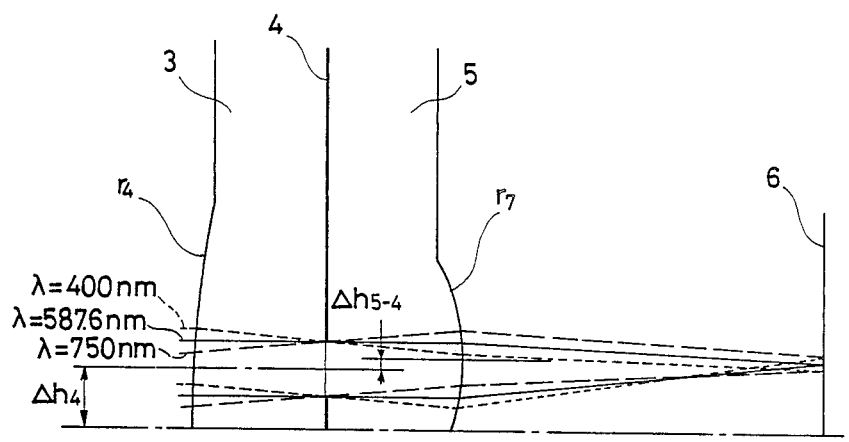
FIG. 4 is an enlarged view showing the essential part of an optical system for a focus detecting apparatus according to one embodiment of the present invention.

FIG. 4 shows the essential part of an optical system according to one embodiment of the present invention that is capable of attaining its object. The individual components (elements) of this system are identical to those shown in FIG. 1 except that the optical axis of the optical splitting element 5 is positioned (offset) outwardly of (away from) the center of the aperture of the diaphragm stop 4 by a predetermined amount of $\Delta h_{5\text{-}4}$ with respect to the principal axis of light.

The amount of offset, $\Delta h_{5\text{-}4}$, is so determined as to satisfy the following condition:

$$1 < \delta < 2 \quad (1)$$

where $\delta = (r_4 \cdot \Delta h_{5\text{-}4})/(r_7 \cdot \Delta h_4)$ in which $r_4$ signifies the radius of curvature of the auxiliary lens 3, $r_7$ denotes the radius of curvature of the optical splitting element 5, and $\Delta h_4$ signifies the amount of offset of the center of the aperture of diaphragm stop 4. It should be noted here that a convex surface is supposed to have a positive radius of curvature while the amount of offset assumes the positive sign in a direction departing from the principal axis of light (optical axis of the condenser lens or the auxiliary lens).

The following are the data sheets for specific embodiments of the present invention. For the meanings of the individual parameters noted in these data sheets, see FIG. 1.

(A) $\delta = 1.27$

TABLE 1

| | | | |
|---|---|---|---|
| Film equivalent surface: | $r_1 = \infty$ | | |
| | | $d_1 = 4.00$ mm AIR | |
| Condenser lens: | $r_2 = 40.000$ mm | $d_2 = 2.00$ mm | $n_1 = 1.49186$ |
| | $r_3 = -7.155$ mm | | |
| | $(k = -0.4)$ | | |
| | | $d_3 = 12.21$ mm AIR | |
| Auxiliary lens: | $r_4 = 10.416$ mm | $d_4 = 1.20$ mm | $n_2 = 1.49186$ |
| | $r_5 = \infty$ | | |
| Decentered aperture: | | $d_5 = 0.04$ mm AIR | |
| | | $(\Delta h_4 = 0.54$ mm$)$ | |
| Splitting optical elements: | $r_6 = \infty$ | $d_6 = 1.25$ mm | $n_3 = 1.49186$ |
| | $r_7 = -1.700$ mm | | |
| | $(\Delta h_{5-4} = 0.112$ mm$)$ | | |

(B) $\delta = 1.39$

TABLE 2

| | | | |
|---|---|---|---|
| Film equivalent surface: | $r_1 = \infty$ | | |
| | | $d_1 = 4.00$ mm AIR | |
| Condenser lens: | $r_2 = 22.000$ mm | $d_2 = 2.00$ mm | $n_1 = 1.49186$ |
| | $r_3 = -7.155$ mm | | |
| | $(k = -0.7)$ | | |
| | | $d_3 = 10.5$ mm AIR | |
| Auxiliary lens: | $r_4 = 10.416$ mm | $d_4 = 1.20$ mm | $n_2 = 1.49186$ |
| | $r_5 = \infty$ | | |
| Decentered aperture: | | $d_5 = 0.04$ mm AIR | |
| | | $(\Delta h_4 = 0.5$ mm$)$ | |
| Splitting optical elements: | $r_6 = \infty$ | $d_6 = 1.25$ mm | $n_3 = 1.49186$ |
| | $r_7 = -1.500$ mm | | |
| | $(\Delta h_{5-4} = 0.1$ mm$)$ | | |

(C) $\delta = 1.67$

TABLE 3

| | | | |
|---|---|---|---|
| Film equivalent surface: | $r_1 = \infty$ | | |
| | | $d_1 = 4.00$ mm AIR | |
| Condenser lens: | $r_2 = 22.000$ mm | $d_2 = 2.00$ mm | $n_1 = 1.49186$ |
| | $r_3 = -7.155$ mm | | |
| | $(k = -0.7)$ | | |
| | | $d_3 = 10.5$ mm AIR | |
| Auxiliary lens: | $r_4 = 10.416$ mm | $d_4 = 1.20$ mm | $n_2 = 1.49186$ |
| | $r_5 = \infty$ | | |
| Decentered aperture: | | $d_5 = 0.04$ mm AIR | |
| | | $(\Delta h_4 = 0.5$ mm$)$ | |
| Splitting optical | $r_6 = \infty$ | $d_6 = 1.25$ mm | $n_3 = 1.49186$ |
| | $r_7 = 1.500$ mm | | |

TABLE 3-continued

| elements: | ($\Delta h_{5-4}$ = 0.12 mm) |
|---|---|

In each of the embodiments (A), (B) and (C), the rear surface ($r_3$) of condenser lens 2 is aspherical and expressed by:

$$x = \frac{ch^2}{1 + \sqrt{1 - (k + 1) c^2 h^2}}, c = 1/r_3$$

where
 h: the height from the optical axis
 k: asphericity coefficient.

The composition of the optical system of the present invention is hereunder described in a more specific manner. By referring to FIG. 4, as simple model can be produced by replacing the auxiliary lens 3 with a wedge prism whose apex faces upward, and the optical splitting element 5 with a wedge prism whose apex faces downward. According to this model, compensation of chromatic aberration can be approximated by the case where the apex angles of the two prisms are equal to each other. Then, the following equation is valid:

$$\Delta h_{5-4} = \frac{r_7 \cdot \Delta h_4}{r_3}. \quad (2)$$

However, the amount of offset, $\Delta h_{5-4}$, determined by equation (2) is insufficient to compensate for;
 (i) the transverse chromatic aberration due to the condenser lens; and
 (ii) the transverse chromatic aberration due to the thicknesses of the auxiliary lens 3 and the optical splitting element 5.

Therefore, in order to compensate for the transverse chromatic aberration contributed by (i) and (ii), it is necessary that an amount of offset that is greater than $\Delta h_{5-4}$ determined by equation (2) should be produced in such a way that the principal rays of light at varying wavelengths will intersect one another on the sensor 6 which is located at a predetermined distance from the optical splitting element 5.

Figure 8:
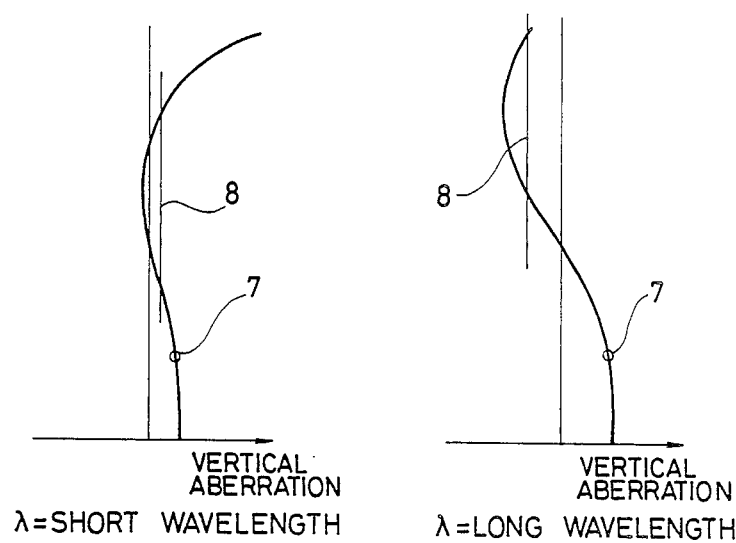
FIG. 8 illustrates the relationship between the spherical aberration of the color of a standard imaging lens and each of the full-aperture focus position 8 and the AF position 7 on both the shorter and longer wavelength sides.

As shown in FIG. 8, the spherical aberration of the color of an imaging lens is in most cases under-compensated for light of the longer wavelength as compared with light of the shorter wavelength and, as a result, the full-aperture focus position 8 of an imaging lens relative to the AF position 7 (the position in focus detected by a focus detecting apparatus) has a tendency to become undercompensated in the longer wavelength range as compared with the shorter range.

Figure 9A:
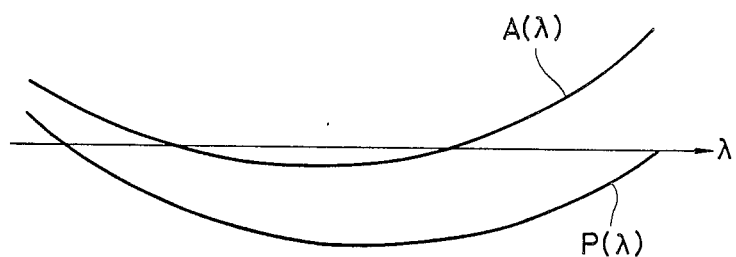
FIG. 9A is a graph showing the general characteristics of $A(\lambda)$ and $P(\lambda)$ which represent the AF position and full-aperture focus position, respectively, as a function of wavelength.
Figure 9B:
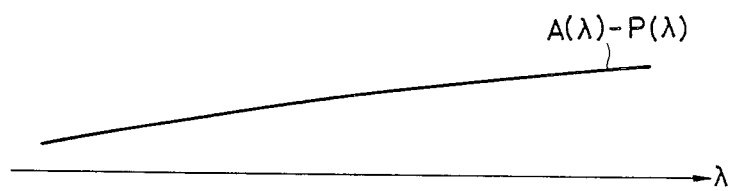
FIG. 9B is a graph showing the "tendency" of a difference function, $A(\lambda)$ and $P(\lambda)$.

Therefore, function $A(\lambda)$ or the AF position 7 versus wavelength and function $P(\lambda)$ or the full-aperture focus position 8 of an imaging lens versus wavelength, can be plotted as shown in FIG. 9A. In this case, the difference function defined by $A(\lambda) - P(\lambda)$ sometimes has the "tendency" depicted by a curve sloping upward to the right as shown in FIG. 9B. If the focus detecting apparatus is designed to produce chromatic aberration that slopes downward to the right in such a way that it cancels the "tendency" of the difference function, the mismatch between the AF position of the imaging lens and its full-aperture focus position can be kept constant irrespective of wavelength. Therefore, in order to compensate for;

(iii) the wavelength-dependent "tendency" of the difference between the AF position of an imaging lens and its full-aperture focus position,
the value of $\Delta h_{5-4}$ must be further increased.

Figure 5:
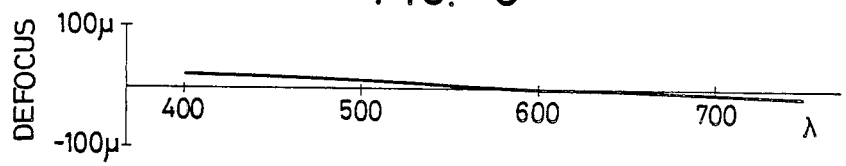
FIGS. 5, 6 and 7 are graphs plotting the chromatic aberrations developing in the embodiments designed according to the data shown in Tables 1, 2 and 3, respectively.
Figure 6:
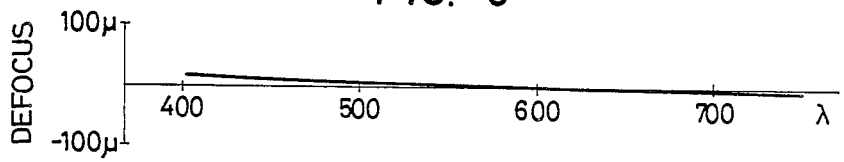
Figure 7:
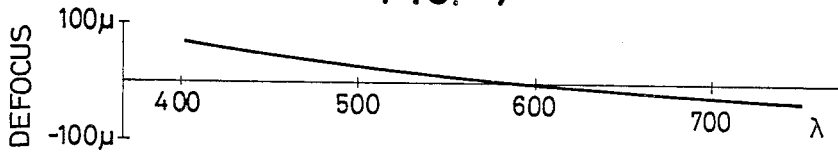

The data sheets given in Tables 1, 2 and 3 are prepared in accordance with the procedures described above. In the embodiments designed according to the data shown in Tables 1 and 2, the chromatic aberration is of about the same magnitude and the degree of overcompensation is somewhat decreased. The amounts of chromatic aberration developing in these two embodiments are respectively shown in FIGS. 5 and 6. The embodiment shown in Table 3 is designed to permit a greater amount of overcompensation than in the embodiments shown in Tables 1 and 2. Since the difference function defined by $A(\lambda) - P(\lambda)$ may assume various forms, the data sheet given in Table 3 is certainly effective for the purposes of the present invention. Therefore, the inequality that should be satisfied by $\delta$ need not be strictly limited to the range specified in the three embodiments described above and satisfactory results may well be attained even if the range of this inequality is slightly expanded as expressed by condition (1).

What is claimed is:

1. In an optical system for use in a focus detecting apparatus that includes a pair of diaphragm stops and a pair of optical splitting elements disposed just behind said diaphragm stops, both pairs being symmetrical with respect to the principal axis of light, and which detects the focus position by detecting the relative positional mismatch between the refocused images of an object, the improvement wherein the optical axis of each of said optical splitting elements is positioned away from the center of aperture of each of said diaphragm stops with respect to the principal axis of light so as to compensate for any transverse chromatic aberration that may develop in said focus detecting apparatus.

2. In an optical system for use in a focus detecting apparatus that includes a pair of diaphragm stops and a pair of optical splitting elements disposed just behind said diaphragm stops, both pairs being symmetrical with respect to the principal axis of light, and which detects the focus position by detecting the relative positional mismatch between the refocused images of an object, the improvement wherein the optical axis of each of said optical splitting elements is positioned away from the center of aperture of each of said diaphragm stops with respect to the principal axis of light so as to produce chromatic aberration that cancels the wavelength-dependent "tendency" of the difference between the AF position of an imaging lens and its full-aperture focus position.

3. In an optical system for use in a focus detecting apparatus that includes an auxiliary lens having its optical axis on the principal axis of light, a pair of diaphragm stops and a pair of optical splitting elements disposed just behind said diaphragm stops, both pairs being disposed behind said auxiliary lens in a manner symmetrical with respect to the principal axis of light, and which detects the focus position by detecting the relative positional mismatch between the refocused images of an object, the improvement wherein in order to compensate for transverse chromatic aberration, $\Delta h_{5-4}$ or the amount by which each of said optical splitting elements is offset from the center of aperture of each of said diaphragm stops is determined in such a way that the following conditions is satisfied:

$$1 < \frac{r_4 \cdot \Delta h_{5-4}}{r_7 \cdot \Delta h_4} < 2$$

where $\Delta h_4$ signifies the amount of decentering of each of said diaphragm stops, $r_4$ denotes the radius of curvature of said auxiliary lens, and $r_7$ signifies the radius of curvature of each of said optical splitting elements, provided that a convex surface is supposed to have a positive radius of curvature while the amount of offset or decentering assumes the positive sign in a direction departing from the principal axis of light.

* * * * *